United States Patent [19]
Harrison et al.

[11] Patent Number: 5,475,683
[45] Date of Patent: Dec. 12, 1995

[54] METHOD AND APPARATUS FOR PERMITTING RADIO UNIT ROAMING BETWEEN TRUNKED RF TRANSMISSION SITES OVER A WIDE AREA THAT ENCOMPASSES PLURAL MULTISITE NETWORKS

[75] Inventors: Stephen D. Harrison, Lynchburg; Charles P. Brame, Forest, both of Va.

[73] Assignee: Ericsson GE Mobile Communications Inc., Research Triangle Park, N.C.

[21] Appl. No.: 178,548

[22] Filed: Jan. 7, 1994

[51] Int. Cl.$^6$ .................................................. H04J 3/14
[52] U.S. Cl. .................... 370/68.1; 370/95.1; 370/110.1
[58] Field of Search ............................ 370/17, 50, 85.13, 370/95.1, 95.2, 95.3, 68.1, 110.1; 379/59,60, 63; 455/33.1–33.4

[56] References Cited

U.S. PATENT DOCUMENTS

| | | | |
|---|---|---|---|
| 4,833,701 | 5/1989 | Comroe et al. | 379/60 |
| 4,833,702 | 5/1989 | Shitara et al. | 379/60 |
| 4,905,301 | 2/1990 | Krolopp et al. | 455/34 |
| 4,972,460 | 11/1990 | Sasuta | 379/60 |
| 4,989,204 | 1/1991 | Shimizu et al. | 370/94.1 |
| 5,093,926 | 3/1992 | Sasuta | 455/34 |
| 5,093,927 | 3/1992 | Shanley | 455/34 |
| 5,109,527 | 4/1992 | Akerberg | 455/33.2 |
| 5,125,103 | 6/1992 | Grube et al. | 455/33.1 |
| 5,128,938 | 7/1992 | Borras | 370/95.1 |
| 5,150,362 | 9/1992 | Akerberg | 370/95.1 |
| 5,212,805 | 5/1993 | Comroe et al. | 455/33.1 |

*Primary Examiner*—Melvin Marcelo
*Attorney, Agent, or Firm*—Nixon & Vanderhye

[57] ABSTRACT

Digitally trunked radio transceivers are permitted to roam over an extended coverage area including two or more digitally trunked radio frequency communication networks. Each network includes at least one digital repeater site having a corresponding site coverage area and serving digitally trunked radio transceivers disposed within or near the site coverage area. Each network also includes a local multisite switch for routing communications between the digital repeater sites within the networks. Site adjacency information is established for each site and communicated between the networks. Each digitally trunked transceiver maintains a site adjacency list for its currently selected site and modifies that list when the transceiver roams into a new site coverage area and selects a new repeater site.

14 Claims, 10 Drawing Sheets

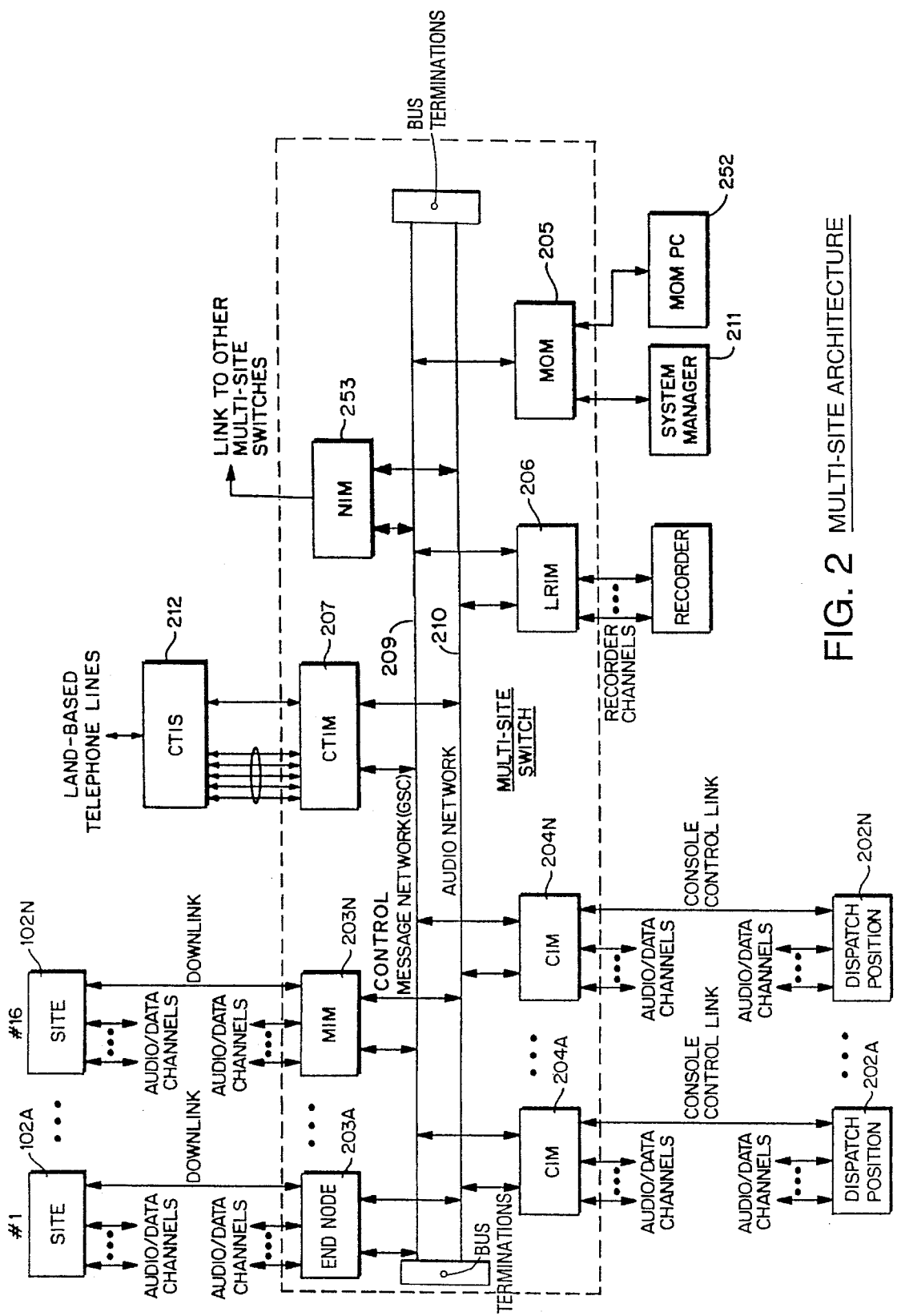
FIG. 2 MULTI-SITE ARCHITECTURE

INTERFACE MODULE (NODE)
CONTROLLER ARCHITECTURE

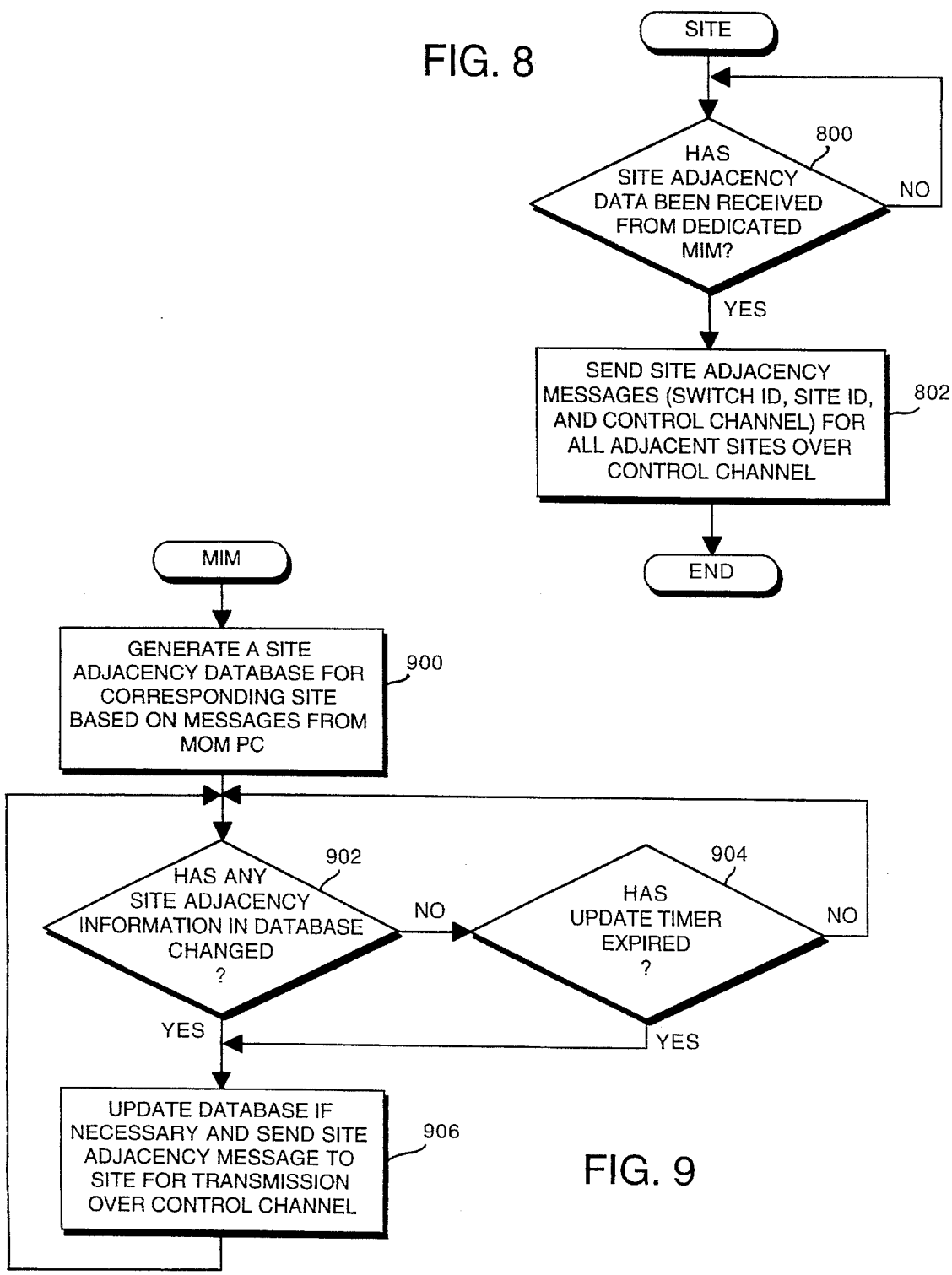

METHOD AND APPARATUS FOR PERMITTING RADIO UNIT ROAMING BETWEEN TRUNKED RF TRANSMISSION SITES OVER A WIDE AREA THAT ENCOMPASSES PLURAL MULTISITE NETWORKS

FIELD OF THE INVENTION

This invention relates to trunked radio frequency (RF) communications, and more particularly, to trunked RF communications systems where mobile radios may freely roam between trunked rf communication sites over a wide area that encompasses plural multisite switch networks.

BACKGROUND AND SUMMARY OF THE INVENTION

The present invention relates to a network of several single site trunked radio systems. Digital trunked radio transceivers capable of handling communications between numerous mobile units and dispatcher consoles in a single area are known. Trunked RF repeater systems are used, for example, by public service organizations (e.g., governmental entities such as counties, fire departments, police departments, etc.). Such RF repeater systems permit a relatively limited number of RF communications channels to be shared by a large number of users—while providing relative privacy to any particular RF communication (conversation). Typical state-of-the-art RF repeater systems are "digitally trunked" and use digital signals conveyed over the RF channels (in conjunction with digital control elements connected in the system) to accomplish "trunking" (time-sharing) of the limited number of RF channels among a large number of users.

Briefly, such digitally trunked RF communications systems include a "control" RF channel and multiple "working" RF channels. The working channels are used to carry actual communications traffic (e.g., analog FM, digitized voice, digital data, etc.). The RF control channel is used to carry digital control signals between the repeater sites and user RF transceivers (radio units) in the field. When a user's transceiver is not actively engaged in a conversation, it monitors the control channel for "outbound" digital control messages directed to it. User depression of a push-to-talk (PTT) switch results in a digital channel request message requesting a working channel (and specifying one or a group of callees) to be transmitted "inbound" over the RF control channel to the repeater site. The repeater site (and associated trunking system) receives and processes the channel request message.

Assuming a working channel is available, the repeater site generates and transmits a responsive "outbound" channel assignment digital message over the RF control channel. This message temporarily assigns the available working channel for use by the requesting transceiver and other callee transceivers specified by the channel request message. The channel assignment message automatically directs the requesting (calling) transceiver and callee transceivers to the available RF working channel for a communications exchange.

When the communication terminates, the transceivers "release" the temporarily assigned working channel and return to monitoring the RF control channel. The working channel is thus available for reassignment to the same or different user transceivers via further messages conveyed over the RF control channel. An exemplary "single site" trunked RF repeater system is disclosed in commonly-assigned U.S. Pat. Nos. 4,905,302 and 4,903,321 which are incorporated here by reference.

Single site trunked RF repeater systems may have an effective coverage area of tens of square miles. It is possible to provide one or more satellite receiving stations (and a single high power transmitting site) if a somewhat larger coverage area is desired. However, some governmental entities and other public service trunking system users may require an RF communications coverage area of hundreds of square miles. In order to provide such very large coverage areas, it is necessary to provide multiple RF repeater sites and to automatically coordinate all sites so that a radio transceiver located anywhere in the system coverage area may efficiently communicate in a trunked manner with other radio transceivers located anywhere in the system coverage area.

FIG. 1 is a schematic diagram of a simplified exemplary multiple-site trunked radio repeater system having three radio repeater (transmitting/receiving) sites S1, S2, and S3 providing rf communications to geographic areas A1, A2, and A3, respectively. Mobile or portable transceivers within area A1 transmit signals to and receive signals from site S1; transceivers within area A2 transmit signals to and receive signals transmitted by site S2; and transceivers within area A3 transmit signals to and receive signals transmitted by site S3. Each repeater site S1, S2, S3 includes a set of repeating transceivers operating on a control channel and plural RF working channels. Each site typically has a site controller (e.g., a digital computer) that acts as a central point for communications in the site, and is capable of functioning relatively autonomously if all participants of a call are located within its associated coverage area.

To enable communications from one area to another a switching network, a "multisite switch" may be provided to establish audio and control signal pathways between repeaters of different sites. These pathways are set up at the beginning of each call and taken down at the end of each call. For example, the site controller (S1) receives a call from a mobile radio in A1 requesting a channel to communicate with a specific callee. A caller requests a channel simply by pressing the push-to-talk (PTT) button on his microphone. This informs the site controller S1 via an "inbound" digital control message transmitted over the RF control channel that a working or audio channel is requested. The site controller assigns a channel to the call and instructs the caller's radio unit to switch from the control channel to the audio channel assigned to the call. However, this assigned working channel is applicable only within the area covered by that site.

In addition, the site controller sends the channel assignment to multisite switch (200) which assigns an internal audio time slot to the call. The multisite switch also sends a channel request over a control messaging bus to other site controllers having a designated callee within their site area. Audio signals are routed through the multisite switch such that audio pathways are created to serve one or more callees and one or more dispatcher consoles 202 involved in the communication. Upon receiving a channel request, these "secondary" site controllers (in the sense they did not originate the call) assign an RF working channel to the call. Each secondary working channel is operative only in the area covered by the secondary site controller. The secondary site controller(s) also sends the channel assignment back up to the multisite switch.

Thus, the caller communicates with a radio unit or group of radio units in another area via the multisite switch. The call is initially transmitted to the primary site controller, routed through an assigned audio slot in the switch, and retransmitted by the secondary sites on various assigned channels in those other areas. When the call ends, the primary site controller deactivates the assigned channel for that site and notifies multisite switch 200 that the call is terminated. The multisite switch propagates an end of call command ("channel drop") to all other site controllers. This releases all working channels assigned to the call and breaks the associated audio routing pathways.

In addition to providing communications between mobile radio units in different areas, multisite switch 200 provides communications between land-line telephone subscribers through control telephone interconnect switch (CTIS) 212 and radio units as well as dispatchers and mobile radio units. Each dispatch console 202 may participate in calls in its area. Thus, when a call comes through the multisite switch from another area to a mobile radio, the switch informs the dispatch console 202 of the call in addition to notifying the corresponding site controller 102. The dispatch operator can then listen or participate in the call. Multisite switch 200 also handles calls to groups of mobile units and/or dispatch consoles by ensuring that the site controllers for all of the callees in the group assign a channel to the group call.

The multisite switch preferably includes a distributed control architecture. The logical functions and computational workload of the multisite switch are shared by various distributed microprocessor "nodes". Each node is connected either to a site controller 102, dispatch console 202, public and/or private landline telephone exchanges and other components of the particular communications system. Most nodes function as switch interfaces and include, for example, Master Interface Modules (MIMs) for nodes coupled to site controllers and Console Interface Modules (CIMs) for nodes coupled to dispatch consoles. Each interface module is supported by a controller card that utilizes several microprocessors. All of the cards have substantially the same hardware and are interchangeable. Each card acts as a gateway interface into the distributed control switch network. Detailed description and operation of such a distributed multi-site switch is set forth in commonly assigned U.S. Pat. No. 5,200,954 to Teel, Jr. et al. which is also incorporated herein by reference.

Trunked communication links between one or more multisite systems may be accomplished using dedicated Network Interface Modules (NIM) provided in the multisite switch to permit the interconnection and communication between multiple multisite switch controlled networks to create an extended overall communications network as described, for example, in commonly assigned U.S. patent application No. 08/156,785 entitled "Extended Trunked RF Communications System Networking" to Kent, the disclosure of which is incorporated herein by reference. In essence, the Network Interface Module allows a remote multisite switch controlled network to appear as just another node to the local multisite switch. Each network can then communicate over this common "node" interface permitting internetwork communication that is predominantly transparent to a network user. Moreover, using a plurality of network interface modules per switch, the overall communications network can be much extended by connecting individual multisite switch controlled networks together, for example, in series, "star" or multiple "star" configurations.

Permitting mobile radios to roam for one trunked rf communications site to another is known. For example, each site may allocate several "roaming ID's" to be temporarily assigned to roaming mobile radios that requests such roaming ID's. However, this procedure significantly reduces the already limited communication resources in each site by reserving some of those resources for roaming radios. This procedure is also inefficient because those reserved communication resources will go unused much of the time so they can be available to roaming radios. Moreover, a considerable amount of overhead is required to centrally track whether a radio is using its home selected ID or a temporarily assigned roaming ID.

Roaming between adjacent site areas may also be accomplished to the extent that a radio's personality (i.e., a preprogrammed memory in each radio) is preprogrammed with relevant site information including a current site identification number, control channel number, site priority, a site frequency set with control and working channel frequencies, specific talk groups, and a list that defines the "adjacencies" between site areas. "Adjacencies" refer to those sites that are physically located next to the currently selected site. For example, sites S2 and S3 are adjacencies for site S1 in FIG. 1. The adjacencies list permits the radio to know which sites are next to the site area in which it is presently located.

Unfortunately, such adjacency lists are static in the sense they are prestored in the radio's personality. However, to permit radios to roam freely over a wide area such as from one city to another city (requiring multiple multi-site switches) would require a large personality memory to store all potential site adjacency information for such a wide area. In fact, many users of trunked radio communications systems now desire coverage on the order of 100 or more sites, and even greater coverage is likely to be desired. Of course, there is are practical limits (e.g., size, cost, etc.) to the amount of adjacent site information that can be prestored in the radio personality. In addition, as the communications network extends, it becomes necessary to reuse channel numbers, frequency sets, site IDs, etc. as a radio roams out of range form one multi-site switch network to another.

Thus, there is a need for a system that permits a mobile radio to roam from site areas in one multi-site switch network to another multi-site switching network without having to know in advance an adjacency list for every conceivable adjacency configuration for every site in multiple multi-site networks. In such a system, radio units should only need a relatively small memory to store the most currently relevant site adjacency information. Moreover, reuse of trunked communication resources like site and channel numbers as well as frequency sets should be permitted.

In response to these needs and problems, the present invention provides for each radio a small, reprogrammable personality memory for storing the current relevant adjacency information given the roaming radio's present location, i.e., identification number, control channel number, and adjacent site index for an adjacent site. That adjacency "list" or "table" is continuously updated by adjacent site control channel messages received from the current site as the radio roams from site to site and from multisite switch to multisite switch.

Each site is provided with the adjacency information via messages over the extended multi-site switch networks. To accomplish this, distributed databases of adjacency control channel requirements for plural multi-site switch networks are created and maintained in each dedicated site interface node (MIM) and network interface node (NIM) of every multi-site switch included in the extended trunked communications network. The database maintains for each site defined in the extended area internal (the current or local multi-site switch) and external (other remote multi-site switches) adjacent site and control channel information. Each distributed node (a MIM) corresponding to a trunked communications site in the multisite switch network uses its database to report adjacency data to its trunked site. The database includes site, control channel and multisite switch number information for the current and adjacent sites. The network interface node (NIM) in each switch uses its database to report and request adjacency data to/from other multi-site switch networks.

A method in accordance with the present invention permits digitally trunked radio transceivers to roam over an extended coverage area including two or more digitally trunked radio frequency communication networks. Each network includes at least one digital repeater site having a corresponding site coverage area and serving digitally trunked radio transceivers disposed within or near the site coverage area. Each network also includes a local multisite switch for routing communications between the digital repeater sites within the two or more networks. Site adjacency information is established for each site and communicated between the networks.

A site adjacency list is maintained by each digitally trunked transceiver and modified as the radio transceiver roams into new coverage areas. More specifically, as the transceiver roams, it monitors the fidelity of communications received from a currently selected repeater site and an adjacent repeater site is included in the transceiver site adjacency list. The transceiver selects a new repeater site when the fidelity of communications received from a currently selected repeater site is less than that received from repeater sites included in the transceiver's site adjacency list.

A trunked communication system in accordance with the present invention permits portable/mobile radio units to roam from one geographical area to another over a wide area communications network. Plural trunked rf repeater site controllers located in associate geographical areas coordinate rf communications with radio units within or near their associated areas. Each radio unit dynamically selects a current site controller having the most optimal communications channel characteristics for conducting communications over the wide area network.

The network includes plural digital switches where each digital switch includes: a first bus for conveying digital audio information during preassigned time slots to interface modules connected to the first bus; a second bus for conveying operational control message information to interface modules connected to the second bus; site interface modules where each site interface module interfaces communications between the first bus and a corresponding one of the site controllers; and a network interface module for providing one digital switch with the capability that the transferred received both first and second bus information to/from another digital switch. Means are provided for transferring adjacency site information between the digital switches for updating adjacency site information as radio units roam over the wide area network.

BRIEF DESCRIPTION OF THE DRAWINGS

These and other features and advantages of the present invention will become more completely understood by referring to the following detailed description of presently preferred exemplary embodiments in conjunction with the FIGURES in which like reference numerals refer to like elements throughout:

FIG. 2 is a schematic of an exemplary architecture for a distributed, digitally trunked, RF communications multisite switching network;

FIG. 8 is a flow diagram outlining exemplary processing procedures for site adjacency database configuration and update for each site as well as site adjacency messages transmitted over the site control channel to radios within site area;

FIG. 9 is a flow diagram outlining exemplary processing procedures for building and updating a local switch site adjacency database for each dedicated site node or MIM.

DETAILED DESCRIPTION OF THE DRAWINGS

In the following description, for purposes of explanation and not limitation, specific details are set forth, such as particular circuits, circuit components, interfaces, techniques, etc. in order to provide a thorough understanding of the present invention. However, it will be apparent to one skilled in the art that the present invention may be practiced in other embodiments that depart from these specific details. In other instances, detailed descriptions of well known methods and programming procedures, devices, and circuits are omitted so as not to obscure the description of the present invention with unnecessary detail.

Figure 1A:
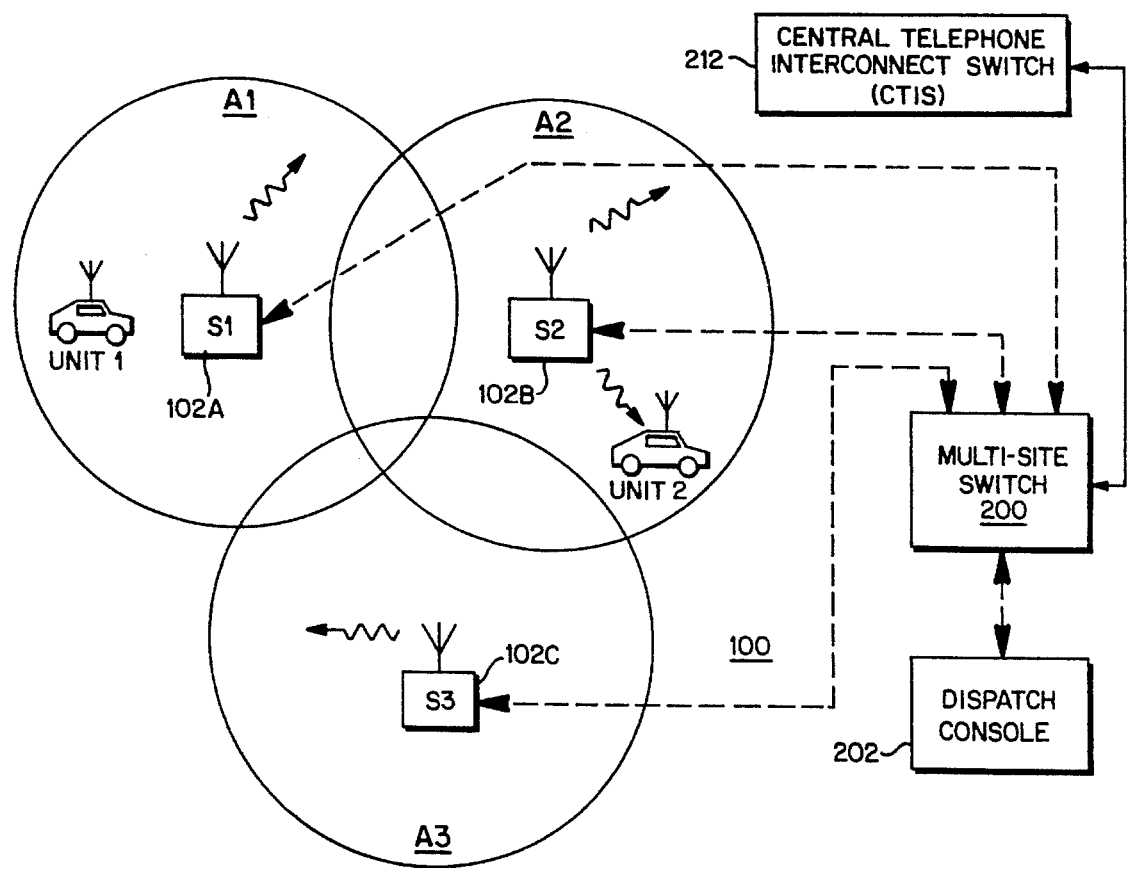
FIG. 1(a) is a schematic illustration of an exemplary multisite trunked RF communications system.

An exemplary trunked radio repeater system 100 in accordance with the invention is generally depicted and was described above in conjunction with in FIG. 1. In the preferred multisite system 100, for example, the site controller (S1) receives a call from a mobile radio in coverage area A1 requesting a channel to communicate with a specific callee or group of callees. The caller requests the channel simply by pressing the push-to-talk (PTT) button on the microphone of his remote RF transceiver. This informs the site controller via an "inbound" digital control message transmitted over its assigned RF control channel that an audio working channel is needed. The site controller assigns a working channel to the call and instructs the caller's radio unit to switch from the control channel to the assigned working channel. This assigned working channel is thus ready to support communications within the area covered by the site.

In addition, the site controller sends a message indicating the working channel assignment to multisite switch 200. The switch, in turn, sends a channel request to all other site controllers and routes audio signals such that an audio signal pathway is created between the RF site repeater servicing the caller and the RF site repeater(s) servicing the callee(s). Additional audio signal pathways may also be established in similar fashion such that one or more dispatch consoles 202 and land-line subscribers (via CTIS 212) may become involved in the communication. Upon receiving a channel request message, these "secondary" site controllers may each assign an RF working channel to the call (e.g., if a callee designated by the caller's channel request message happens to be physically located within the coverage area serviced by the associated RF transceiving site). Meanwhile, multisite switch 200 ensures that the caller's audio has been routed from the active RF receiver of site S1 to active transmitters of each of the other sites participating in the call.

Figure 1B:
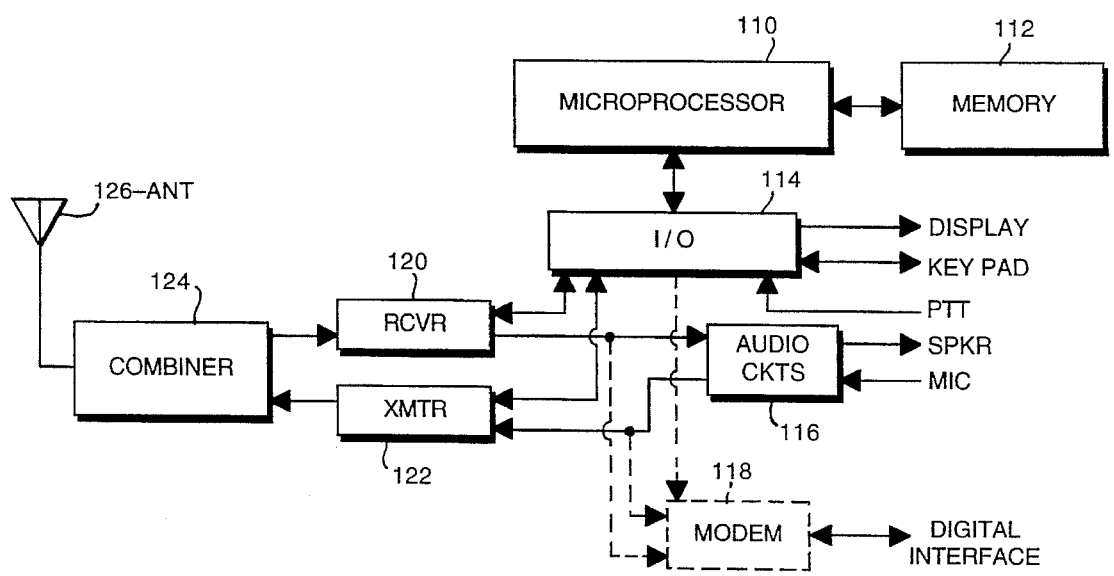
FIG. 1(b) is a block diagram of a mobile/portable radio communications unit.

The general architecture of a suitable mobile/portable radio unit for use within the extended trunk radio communication's network within accordance with the present invention is now described in conjunction with FIG. 1b. Microprocessor 110 is provided with suitable memory 112 and input/output circuits 114 so as to interface with the radio unit display, keypad, push-to-talk (PTT) switch as well as audio circuits 116 which provide basic analog audio outputs to the speaker and accept audio inputs from the microphone. Auxiliary control over a modem 118 as a digital interface (e.g. to voice encryption, vehicle location, or other types of digital communication sub-systems) may also be provided if desired. Of course, the I/O circuits 114 also permit suitable programmed control over rf receiver 120 and transmitter 122 which, via conventional signal combiner 124, permit two-way, fully duplex communication over a common antenna 126 as will be appreciated by those skilled in the art.

FIG. 2 is a detailed schematic diagram of the architecture of multisite switch 200 provided by the presently preferred exemplary embodiment of this invention. The multisite switch 200 communicates with each site controller 102 and dispatcher console 202 via data and audio communication lines which may include dedicated land lines or microwave links.

The multisite switch 200 establishes and removes audio connections between sites 102 and dispatch consoles 202 using a local area network of nodes (e.g., MIMs, CIMs, NIMs, CTIM, and MOMs). As shown in FIG. 2, the nodes are labelled corresponding to whether they interface with a site controller, dispatch console, landline telephone switch, another multisite switch or some other system component (or as in the case of MOM 205 perform some other control function). For example, MIMs 203 are interface modules in the switch that interface with site controllers, and CIMs 204 are nodes that interface with dispatch consoles. The MOM 205 supervises control communications over the control message bus and interfaces the system manager 211 and the MOM PC (personal computer) 252 that have supervisory responsibility for multisite switch 200 and the overall radio communications system as connected through the switch. The LRIM (206) interfaces recorders to the switch assigned to log calls for various groups or units. The CTIM (207) functions much the same as a MIM with respect to interfacing a site to the multisite switch except that it interfaces to landline telephone lines from Central Telephone Interconnect Switch (CTIS) 212 to switch 200. The Network Interface Module (NIM) 253 interfaces one multisite switch 200 to another multisite switch at another similar radio communications system to provide an even greater wide area coverage. Using NIM 253, multiple multisite switches can be connected in various configurations to provide a much extended communications network.

Each node in the multisite switch is supported by a microprocessor-based controller module. All of the nodes (the MIMs, CIMs, CTIM, MOM, LRIM, and NIM) have the same hardware and are interchangeable. The nodes have different "personalities" to indicate that they are assigned to, for example, a site controller or a dispatch console, etc. Each node can be easily configured to be a MIM, CIM, etc. by setting a few switches.

As shown in FIG. 2, the nodes of multisite switch 200 are connected into a control message network 209 and a digital audio time division multiplex (TDM) network 210. The control message network 209 is preferably a message network employing a conventional Global Serial Channel (GSC) digital messaging protocol, for example, as implemented using an Intel 80C152 GSC microprocessor. The GSC microprocessor is used as the communications controller in a controller module in each node and is essentially dedicated to performing I/O functions for the node. The control message bus 209 is a high speed data bus that interconnects the communication processors in the controller of each node.

The audio bus 210 comprises up to thirty-two (32) time division multiplexed buses in a preferred embodiment. Each bus contains thirty-two (32) slots, each slot corresponding to a single audio channel. Therefore, a maximum of 1024 audio slots may be routed through the multisite switch (i.e., 32 buses×32 slots), although some of the slots are used for other purposes (e.g. signalling). In the presently preferred embodiment, eight (8) buses are provided and only 240 channels of digitized audio are carried by audio TDM network 210.

MOM 205 is the interface module for System Manager 211 and MOM PC (personal computer) 250. The System Manager updates databases maintained in all of the nodes. The MOM 205 maintains certain specialized databases including databases for smart calls, confirmed calls, and activity status of every node in the network. A node's status (e.g., active or inactive) is monitored periodically by the MOM. Polling messages from the MOM addressing specific blocks of nodes are transmitted over control message bus 209. Each node monitors the control message bus to determine if its address falls in the range currently being addressed. If it is, the node responds to the poll by sending a Node Access Message (NAM) over the message bus to the MOM. The MOM then correlates each received NAM with its corresponding node of origin to record its active status in the node activity status data base.

As part of the multisite switch initialization procedure, the nodes connect their assigned TDM bus slots to the node's external channel inputs. For example, a MIM will assign each channel from its site controller to a separate audio TDM bus slot on audio network 210. Once the TDM bus slot is linked to the site channel, the bus slot continuously receives the output from the channel through the host node without requiring further channel setup. Of course, the site channel has no intelligible signal until it is assigned to a call by the site controller. Although a TDM bus slot is linked to a corresponding site channel, no other nodes (MIM, CIM, etc.) listen to that bus slot until the host node sends a slot assignment message throughout multisite switch 200 over message network 209 notifying all nodes that an active call from the site has been assigned to that bus slot.

Figure 3:
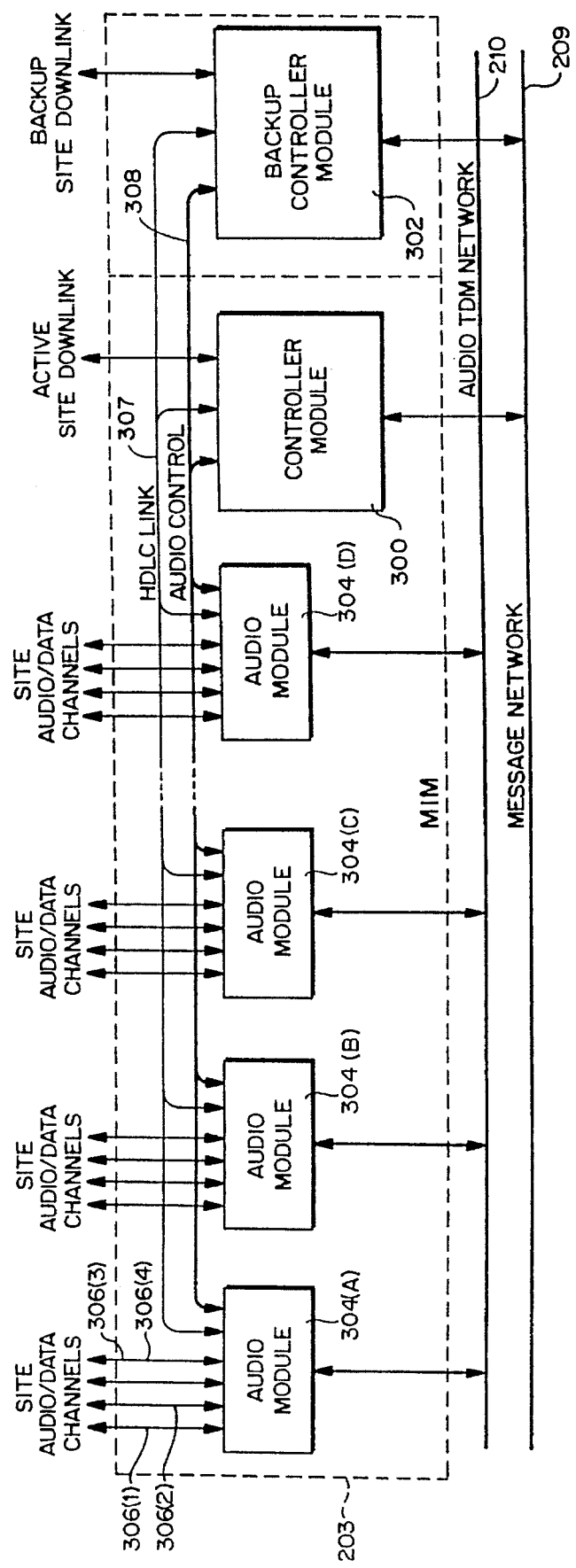
FIG. 3 is a detailed block diagram of a single exemplary node (with multiple audio sources/destinations) shown in FIG. 2.

FIG. 3 is a high level block diagram of a single (multiple audio channel) exemplary MIM 203 provided by the presently preferred exemplary embodiment of this invention. The architecture of other nodes is virtually the same as that for the MIM. As mentioned above, the "highway" used to communicate signals between interface modules includes an audio (TDM) network 210 and a control message network ("GSC") 209. The TDM audio bus simply transfers whatever digital information is placed on the TDM bus slot. MIM 203 typically services multiple RF channels providing multiple audio source/destinations each of which are connected independently to a TDM bus slot.

MIM 203 includes a controller module 300, a backup controller module 302, and plural (preferably eight) audio modules 304 (only four are shown for purposes of illustration). Each audio module 304 in the preferred embodiment is connected to a maximum of four RF repeaters of an RF trunking site, or in the case of a CIM and a CTIM (for console and landline communications) to four bidirectional audio links. For example, audio module 304(A) includes bidirectional audio links 306(1)–306(4) serving associated first through fourth trunked RF repeater site "channels" (i.e., RF transceiving/repeating decks associated with particular trunked RF channels). The audio modules 304 act as source gateways ("entrance/exit ramps") which convert analog audio signals generated by MODEMs from the trunked repeater sites into digitized audio (PCM) signals and place the digitized audio signals onto the audio TDM network 210. These same audio modules 304 act as audio destinations by taking selected signals from the audio TDM network 210, converting them from digital into analog form, and providing the resulting analog signals to the RF repeater site "channels" for transmission via RF links.

Controller module 300 communicates with each of the four audio modules 304 via a common HDLC link 307 and an audio control link 308. The HDLC link 307 is used, for example, to carry fault indications and messages relating to RF "channel" status between audio modules 304 and controller module 300. Audio control link 308 permits the controller module node 300 to set channel parameters (e.g., level adjustment, TDM slot assignment, etc.) within each audio module 304.

Detailed description and operation of the audio modules 304 is set forth in commonly assigned U.S. patent application Ser. No. 07/658,636 entitled "Audio Routing Within Trunked Radio Frequency Multisite Switch" filed on Feb. 22, 1991 and incorporated herein by reference.

Figure 4:
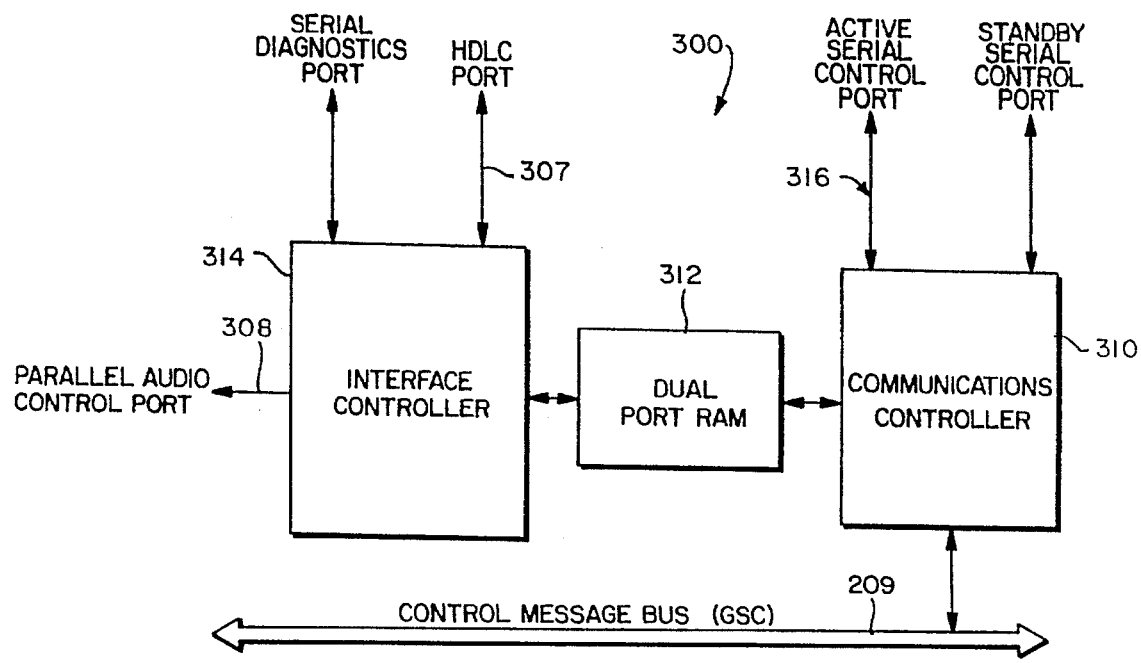
FIG. 4 is a block diagram illustrating the node (interface module) data processing and control message bus architecture.

FIG. 4 shows a block diagram of an exemplary architecture for node controller 300, e.g., the node being MIM 203 or NIM 253. Each node controller 300 includes a communications controller 310, a dual-port random-access-memory (RAM) 312 and an interface processor 314. Communications controller 310 receives and routes control messages between the control message bus 209 and interface processor 314. Communications controller 310 may be, for example, an Intel 80C152 GSC microprocessor. Dual-port RAM 312 is used to communicate between the communications controller and the interface controller. Messages received from site controller 102 over the serial port 316 are translated into a format usable by the multisite switch. The communications controller 310 also translates multisite switch messages into a format that the site controller or console understands.

Interface processor 314 performs substantially all the logical functions for the node (interface module) and is effectively the "intelligence" of MIM 203. Interface processor 314 (which may be, for example, an Intel 80C186 microprocessor) initially assigns TDM bus slots to channels for the individual RF transceivers associated with audio links 306(1)–306(4) of audio modules 304 using parallel audio control bus 308. The interface processor sets up the connection between a site RF channel (or an audio/data channel at a dispatcher console or a CTIS) and the audio slots on the multisite switch TDM audio bus to establish a communications link for a call and also terminates the link when a call ends. As previously described, each MIM is preassigned a set of TDM bus slots for outputting audio signals onto the TDM bus, and these slots are not assigned and deassigned during the course of normal call routing. A more detailed description of the node controller architecture is provided in commonly assigned U.S. Pat. No. 5,239,538 to Gulliford et al., entitled "Controller Architecture for an RF Trunking Multisite Switch", which is incorporated herein by reference.

Each call through multisite switch 200 is patched from its assigned TDM bus slot on the audio bus 210. Since the interface processor for each node assigns slots, connects audio slots to the site controller or dispatch console to establish a communications link, and terminates calls, the nodes must continually inform each other of their slot assignments when a call involving that slot becomes active. Accordingly, the nodes send control messages regarding slot assignments, slot updates and slot idles over the control message network 209 to other nodes.

The communications controller (310) for each node initially processes all of the messages on the GSC message network (209). Slot assignments are forwarded to the interface processor (314) through a dual-port RAM (312). The communications controller also processes slot update and slot idle messages by referring to a slot bit "map" or database, located and maintained in the dual-port RAM, for all TDM bus slots on the audio bus. By referring to the slot bit map, the communications controller determines whether the slot status message conveys information already known, or if the slot status message conveys new information about a TDM bus slot. Update messages are sent regularly by the nodes hosting calls to confirm to other nodes the active status of a slot. When a host terminates a call, it sends a "slot idle" message to the other nodes and also periodically resends idle messages until the slot is involved in another call. Thus, all nodes are continually informed of the status of all TDM bus slots that have been assigned at least once. A more detailed description of the slot bit map and slot status messages is provided in commonly assigned U.S. application Ser. No. 07/658,640 filed on Feb. 22, 1991 entitled "Message Bus Slot Update/Idle Control and RF Trunking Multisite Switch" which is incorporated herein by reference.

Each MIM is coupled to its site controller through a standard serial telephone line or other transmission media. MIMs receive digital command signals from their site controllers 102 through a downlink line as is described in commonly assigned U.S. Pat. No. 4,835,731, entitled "Processor-To-Processor Communications Protocol For A Public Service Trunking System" also incorporated by reference.

Each MIM also maintains a radio unit database that identifies the radio units within its site and the groups that correspond to active calls. These databases are set up by the system manager 211 (FIG. 2) and sent to all interface modules. The radio unit database identifies each mobile radio unit in the wide area system. For each MIM, some of the mobile units will be in its assigned site area and others will be outside of its area. Each MIM keeps track of which units are in its area and which group(s) is currently selected by the unit. Since each mobile unit may be capable of participating in several different groups, the mobile unit operator selects the desired group at any particular time. Whenever a call comes in for the selected group, then the unit will receive the call.

The procedures followed by the multisite switch 200 in responding to a call from a radio unit and from a dispatcher console, confirming receipt of the call request, and terminating the call are described in commonly assigned U.S. Pat. No. 5,200,954 entitled "Communication Link Between Multisite RF Trunked Network and an Intelligent Dispatcher Console," the disclosure of which is incorporated herein by reference.

In accordance with the present invention, to permit the interconnection and communication between multiple multisite switch controlled systems so as to create an extended overall communications network, one or more dedicated Network Interface Modules (NIMs) 253 are also provided within the multisite switch. The Network Interface Module (253) consists of substantially the same hardware as used for other nodes, such as a MIM, but is software configured to allow a remote multisite switch controlled network to appear as just another node to the local multisite switch. Each network can then communicate both TDM audio and GSC message information through this common "node" interface resulting in intersystem communication that is mostly transparent to a network user. Moreover, using the basic MIM site interface design and protocol allows maximum use of existing hardware and software. Furthermore, using a plurality of network interface modules per switch, the overall communications network can easily be much extended, for example, by connecting individual multisite switch controlled networks together in a star or series configuration as explained further herein.

Figure 5:
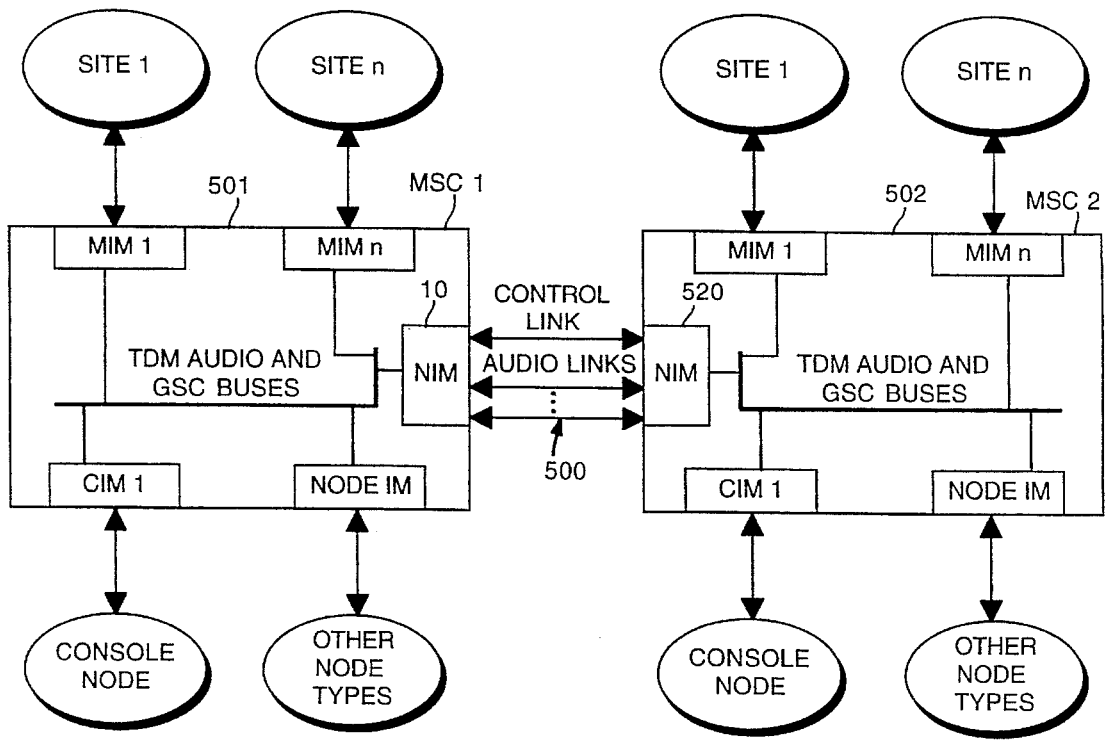
FIG. 5 is a block diagram of a pair of multisite network switches interconnected through a multisite audio and control communication link via a network interface module (NIM)
Figure 6:
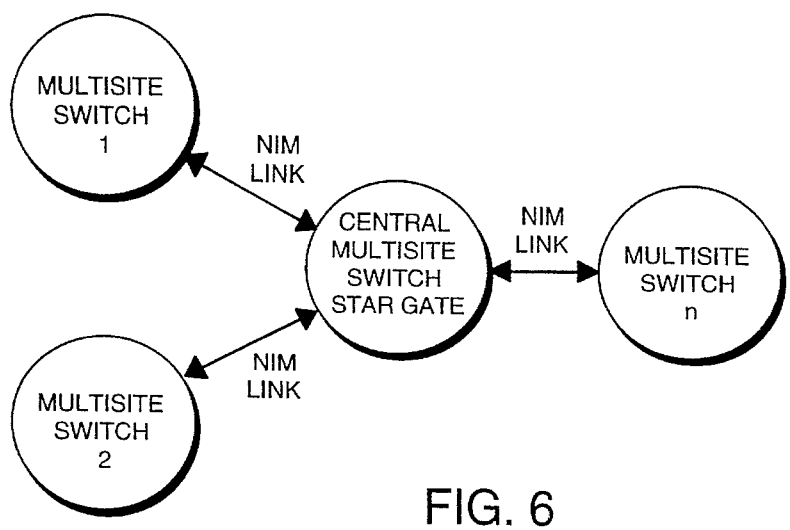
FIG. 6 is a block diagram illustrating an exemplary multiple multisite network configuration having the multisite switches of each network linked together by a central multisite network switch that contains multiple NIMs.

Referring now to FIG. 5, an exemplary extended networking arrangement is shown consisting of a pair of multisite network switches (501,502) interconnected via NIMs (510, 520) through a multisite link (500). For the simple arrangement shown, all that is required is a single multisite link and a single NIM at each multisite switch to control the interface. Multisite link 500 consists of one internetwork control channel and up to twenty (20) internetwork audio channels and may utilize conventional T1 landline or microwave communication links. The NIM essentially performs like a virtual MIM-like site interface between two multisite switches. For a more complex extended network arrangement, multiple NIMs may be utilized at each multisite switch. For example, a "stargate" system arrangement, such as shown in FIG. 6, might consist of more than two multisite switch networks linked together by a central multisite switch network that contains multiple NIMs.

The NIM assigns audio channels in simplex and will assign an idle audio channel for each call attempt. Such simplex channel selection allows each multisite switch to select from the full set of audio channels independently. The NIM operation supports both transmission trunking and control message trunking using simplex or duplex communications for the audio links. To the originating multisite switch network, the NIM appears as a normal node receiving a call over the TDM audio bus (i.e., a MIM-like trunked site). To the destination multisite switch network, the NIM appears as a normal node (trunked site) originating the call. This fully trunked arrangement provides very fast access times throughout the extended network.

Each NIM controller is software configured for performing all node functions, such as tracking channel assignments, updates and idles of other interface modules of the multisite switch in its corresponding data base, in the same manner as described above for the MIMs and other nodes (see commonly assigned U.S. Pat. No. 5,239,538 identified above). In addition, each NIM is also responsible for tracking mobile communication units (operators) between linked multisite networks, monitoring call traffic on the local multisite switch network and routing any calls that have operators tracked to the remote switch network, selecting an audio channel for all calls routed by the NIM, and broadcasting all calls received from the remote multisite switch network to all sites/consoles on the local multisite switch.

Having described an extended trunk communications network trunked radio communication system involving plural multisite switch networks connected by the above described network interface modules with (and without) stargate networks, a detailed description is now provided describing how radios may freely roam between trunked rf communication sites over a wide area that encompasses multiple multisite switch networks. In order to accomplish this wide area free roaming feature, site adjacency databases are constructed in the memories of each radio unit, each site controller, each MIM, and each NIM included in the wide area network. The site adjacency databases include for each site its multiswitch identification number, site identification number, and control channel number. Optionally, each site's working channel frequency set may also be included in this database. Moreover, each database is continually updated with any site adjacency changes via adjacency update messages transmitted over the GSC bus and stargate network. These update messages are required, for example, when different identification and communication channel numbers are periodically assigned.

Figure 7:
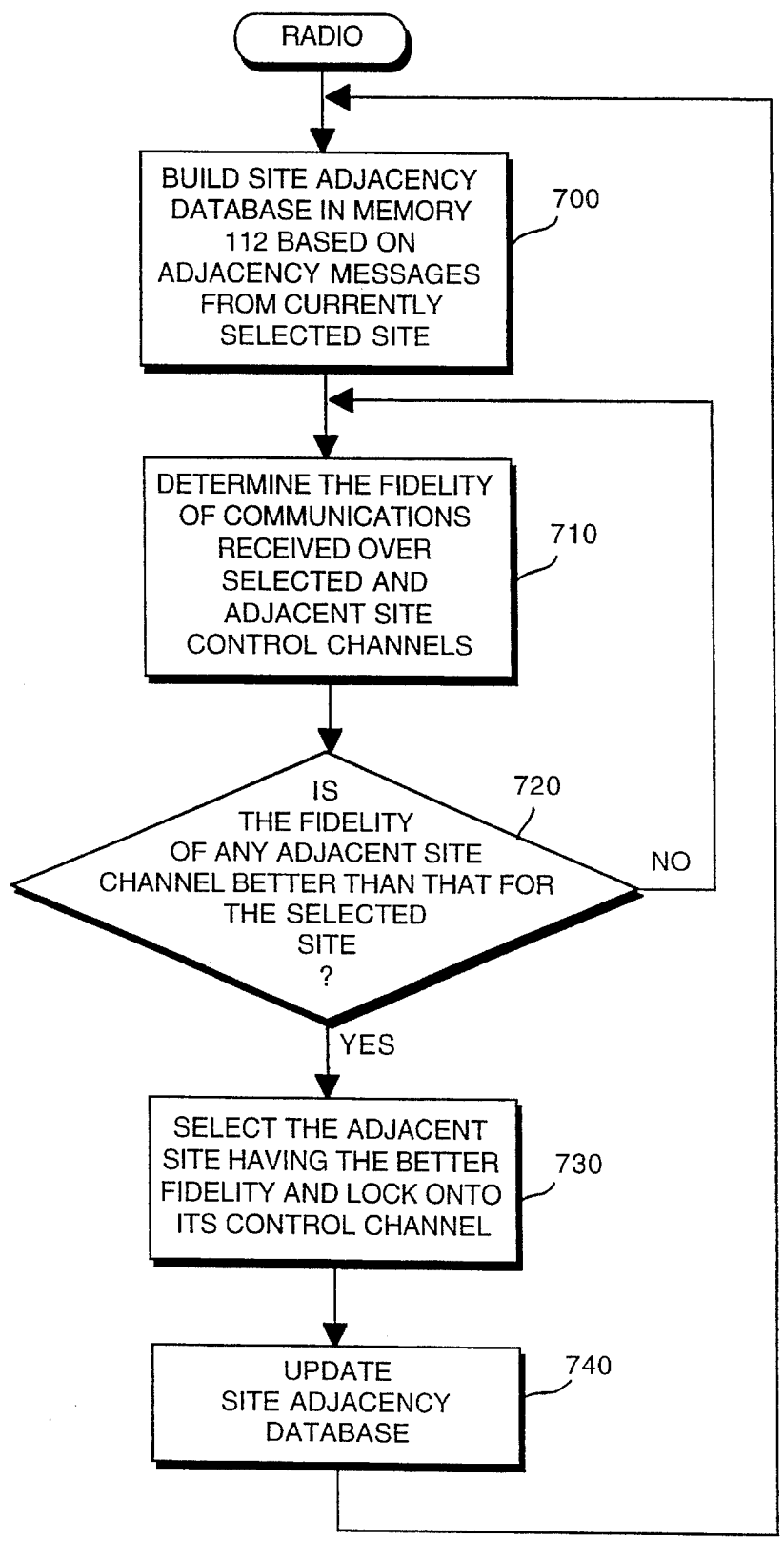
FIG. 7 is a flow diagram outlining exemplary processing procedures for roaming mobile/portable radio units in a trunked RF communication system according to the present invention.

FIG. 7 is a flow diagram which outlines exemplary processing procedures for a roaming radio. First, the radio microprocessor 110 builds a site adjacency database in memory 112 based on control channel messages received from its currently selected site (block 700). See for example the following adjacency database table which includes for each adjacent site: an adjacency number, a site identification number, a control channel number, and a priority designation.

| Adjacency Number | Site ID | Control Channel Number | Priority |
| --- | --- | --- | --- |
| 1 | 3 | 2 | No |
| 2 | 6 | 5 | Yes |
| 3 | 1 | 3 | No |
| . | . | . | . |
| . | . | . | . |
| N | 12 | 1 | No |

Because the radio is roaming, an important ongoing processing task is a determination of the fidelity of the communications received over both the selected and adjacent site control channels included in the site adjacency database (block 710). While many suitable fidelity measurement procedures may be used, e.g. receive signal strength indicator (RSSI) message error rate (MER) in the preferred embodiment of the present invention, a weighted average error dispersion procedure is the desirable fidelity measurement indicator. A detailed description of this preferred fidelity indicator is described in copending, commonly assigned U.S. patent application Ser. No. 08/178,574 filed on Jan. 7, 1994 entitled "A Method and Apparatus for Determining with High Resolution the Fidelity of Information Received on a Communication Channel," which is incorporated herein by reference.

At decision block 720, determination is made whether the fidelity of any adjacent site communication channel included in the site adjacency database is better than the control channel fidelity determined for the selected site. If not, control returns to block 710 to continue with current and adjacent site fidelity calculations. Otherwise control proceeds to block 730 where the radio then selects the adjacent site having the better channel fidelity and locks onto its corresponding control channel. Because the mobile has selected a new site, the sites which are now adjacent to this newly selected site are different than those which are stored in the site adjacency database in the radio's memory 112. Accordingly, in block 740, the radio microprocessor 110 updates the site adjacency database in memory 112 based on control channel messages received from the newly selected site.

Each site informs radios within its site area of the relevant site adjacency information via site adjacency messages periodically transmitted over its control channel. As described now in conjunction with FIG. 8, the site controller determines if its dedicated MIM has transmitted a site adjacency data message (block 800). If so, the site controller reformats the site adjacency data received from its MIM into an over-the-air message format and periodically transmits such site adjacency messages over its control channel (block 802). The site adjacency messages transmitted over the control channel include multisite switch ID, site ID and control channel information for all sites which are adjacent to this current site so that the radio can update its site adjacency database.

Each MIM also maintains site adjacency database for its corresponding site as will now be described in conjunction with FIG. 9. In block 900, the MIM generates a site adjacency database for its corresponding site based on messages received from MOM PC 252. MOM PC 252 is programmed by the system operator with the relevant site adjacency information for each site within the multisite network. In decision block 902, the MIM determines whether any site adjacency information has changed. Any changes are transmitted over the GSC message bus. The MIM uses those changes to update its site adjacency database and send site adjacency update messages over down link control communication line to its corresponding site controller (block 906).

Even if no adjacency information for the site has changed, a determination is made in decision block 904 whether an update timer has expired. If not, control cycles back to block 902 to monitor whether any site adjacency database information has changed. However, if the update timer has expired, control proceeds to block 906 to send a site adjacency message to its site so that the site can reformat the adjacency message and transmit that information over the control channel. The timer could be set, for example, to time out at 25 seconds which minimizes data processing load but assures that roaming radios as well as radios now registered to the current site receive the adjacency information without much delay. Of course, the present invention could also generate site adjacency messages immediately whenever a radio newly registers with the current site.

In order to achieve roaming over an extended, wide area of coverage, the present invention sends site adjacency data through network interface modules (NIMs) in each multiswitch network included in the wide area either through a direct control link as shown in FIG. 5 or through a central multisite switch/stargate as shown in FIG. 6. Site adjacency messages transmitted between multiple multiswitch networks are particularly advantageous in providing an extremely wide area of coverage.

Figure 10A:
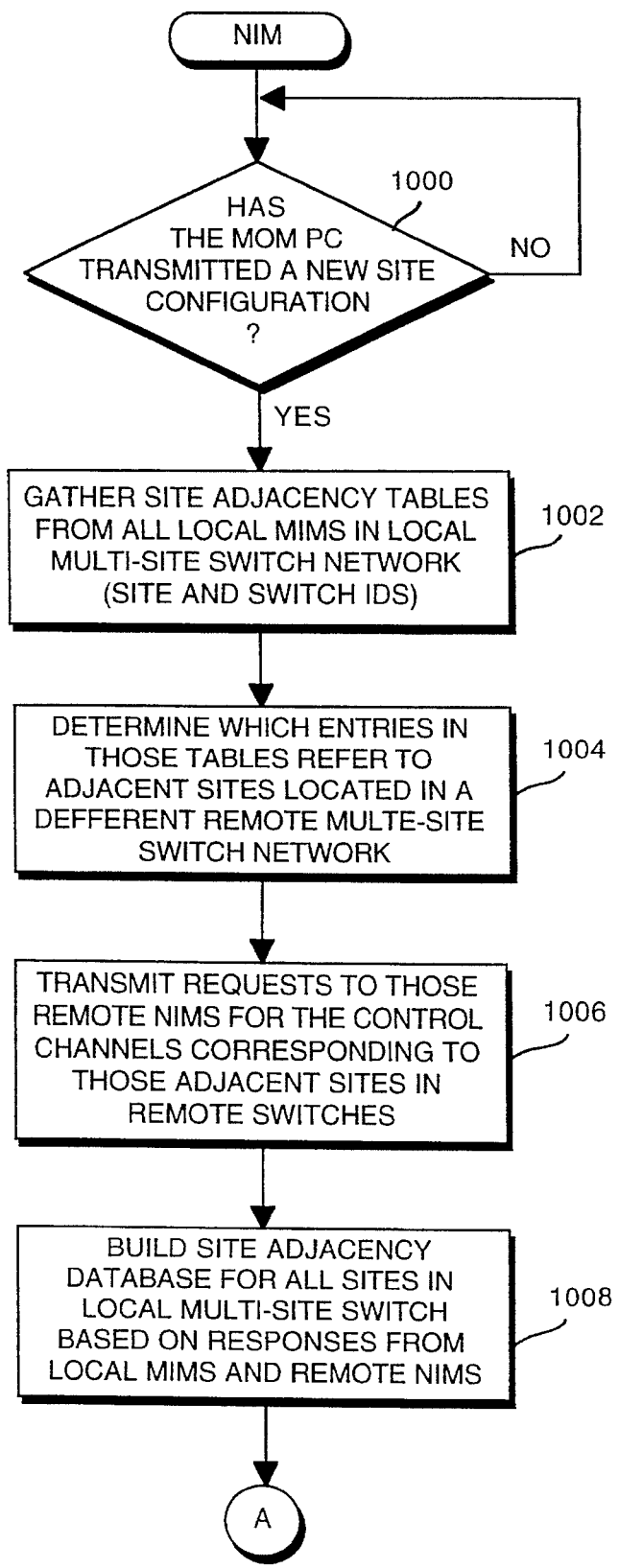
FIGS. 10(a) and 10(b) are a flow diagram outlining exemplary processing procedures for configuration and update of site adjacency information in each NIM.
Figure 10B:
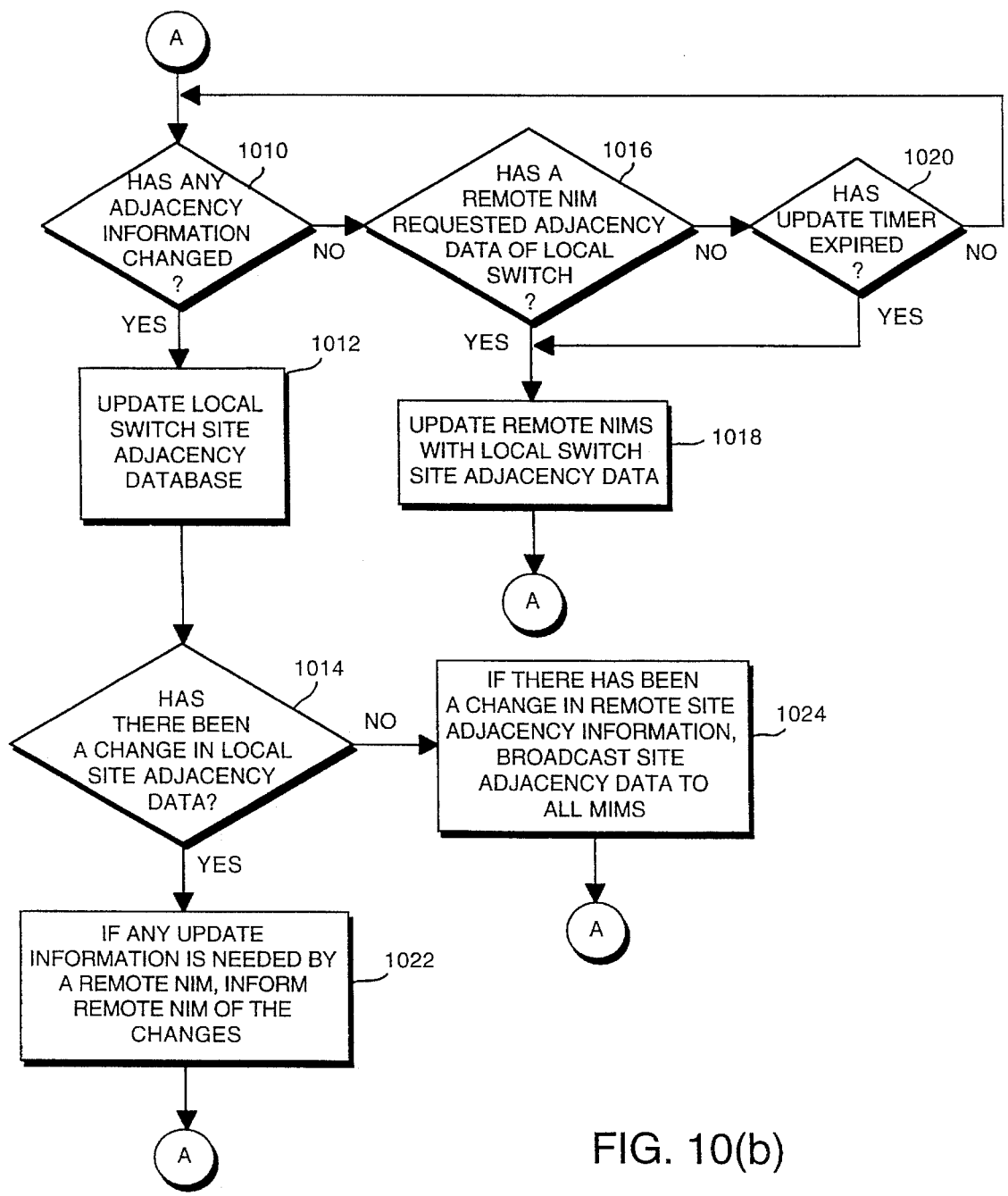

The control procedures followed by each NIM to set up and maintain site adjacency data are now described in conjunction with FIGS. 10(*a*) and 10(*b*). In block 1000, the NIM determines whether the MOM PC in the corresponding local multisite switch has transmitted a new site configuration. If it has, control proceeds to block 1002 where the NIM gathers site adjacency tables from all of the MIMs located in the local multisite switch network. The local MIMs provide a site identification number and a multisite switch identification number where that site is located for each site that is adjacent to the local MIM's corresponding site. Although many of the adjacent sites will be located in the local multisite switch network, there will be instances where sites in the local multisite network are adjacent to sites in remote multisite switch networks. The site adjacency tables gathered from all local MIMs are analyzed (block 1004) to determine which entries in those tables refer to adjacent sites located in different remote multisite switch networks. The NIM then transmits messages to those remote NIMs identified in block 1004 (e.g., via the stargate) requesting identification of the control channels corresponding to those adjacent sites located in the remote multisite switch networks (block 1006). Based on the site adjacency information from the local MIMs and remote NIMs, the local NIM builds a site adjacency database for all sites in the local multisite switch (block 1008).

Control then proceeds to decision block 1010 to determine whether any site adjacency information has changed. If so, the local NIM updates its local multisite switch site adjacency database (block 1012). Control then proceeds to decision block 1014 to determine if the adjacency change was from a local MIM or remote MIM associated with another multisite switch. If the adjacency change is detected from a local MIM and if any of the updated local multisite switch site adjacency information is required by a remote NIM (i.e., to update the site adjacency database in the remote NIM), the local NIM transmits messages, e.g., over the stargate network, to inform that remote NIM of those changes (block 1022). If the change is detected from a remote MIM and a local MIM requires the remote MIM's multisite switch site adjacency information, the local NIM transmits messages, e.g., over the GSC network, to inform the local MIM of those changes (block 1024).

If the site adjacency information has not changed, a decision is made whether a remote NIM has requested site adjacency data of a local multisite switch network (decision block 1016). If it has, the local NIM transmits the requested site adjacency data relating to control channels assigned to sites within the local switch network over the stargate network to the requesting remote NIM (block 1018). Even if no site adjacency information has changed and no remote NIMs have requested site adjacency data from the local multisite switch, the update timer is monitored in decision block 1020 to determine whether the update timer has expired. If it has, the local NIM updates remote NIMs with local switch site adjacency data.

While the invention has been described in connection with what is presently considered to be the most practical and preferred embodiment, it is to be understood that the invention is not to be limited to the disclosed embodiment. On the contrary, the invention is intended to cover various modifications and equivalent arrangements included within the spirit and scope of the appended claims.

What is claimed is:

1. A trunked communications system in which portable/mobile radio units roam from one geographical area to another over a wide area communications network, comprising:

plural trunked rf repeater site controllers located in associated geographical areas for coordinating rf communications with radio units within or near the associated areas, each radio unit selecting one of the site controllers through for conducting communications over the wide area network;

plural digital switches including a local switch and a remote switch, each digital switch including:
a first bus for conveying digital audio information during preassigned time slots to interface modules connected to the first bus;
a second bus for conveying operational control message information to interface modules connected to the second bus;
site interface modules, each site interface module interfacing communications between the first and second buses and a corresponding one of the site controllers; and
a local network interface module connected to the first and second buses for transferring and receiving information between the local and remote digital switches, wherein site configuration information is transferred between the plural digital switches for updating adjacent site configuration information as radio units roam over the wide area network.

2. The system according to claim 1, wherein each radio unit maintains a site adjacency list for a currently selected site controller.

3. The system according to claim 2, wherein each radio unit monitors the fidelity of communications received from a currently selected site controller and adjacent site controllers included in the radio unit's site adjacency list and selects a new site controller when the fidelity of communications received from the currently selected site controller is less than the fidelity of communications received from one of the site controllers included in the radio unit's site adjacency list.

4. The method according to claim 1, wherein each site controller sends one or more site adjacency messages with site adjacency information relevant to that site controller to radio units having selected that site controller.

5. The method according to claim 1, wherein the adjacent site information identifies a site controller using an associated digital switch identification and a site controller identification.

6. A digitally trunked radio frequency communications system, including plural repeater sites having corresponding coverage areas, each site having one or more adjacent sites and serving mobile or portable digitally trunked radio transceivers disposed within the site's coverage area, for supporting digitally encoded radio transceiver communications over distributed control multisite switch networks that route communications between repeater sites within the system, comprising:

a network interface module in a local multisite switch network for transferring and receiving digitally encoded communications including adjacent site information to/from one or more remote multisite switch networks thereby interconnecting a plurality of otherwise independent multisite switches resulting in extended, wide area, digitally trunked, radio frequency communications coverage.

7. The system according to claim 6, further comprising;
means for determining if any adjacent site information has been changed, and means for updating adjacent site information stored in the network interface modules.

8. A method for permitting digitally trunked radio transceivers to roam over two or more digitally trunked radio frequency communications networks, each network including at least two digital repeater sites having a corresponding coverage areas adjacent to each other and serving digitally trunked radio transceivers disposed within or near the coverage areas, and each network including a local distributed control multisite switch for routing communications between said digital repeater sites within the networks, comprising steps of:

(a) communicating site adjacency information between the two or more networks;

(b) establishing and maintaining a site adjacency database for repeater sites in the two or more networks based on the communicated site adjacency information; and (c) modifying a site adjacency list maintained by one of the digitally trunked transceivers as the transceiver roams into a new coverage area and selects a new repeater site corresponding to the new coverage area to coordinate communications to/from the transceiver.

9. The method as in claim 8, wherein each transceiver calculates the fidelity of communications received from a currently selected repeater site and adjacent repeater sites included in the transceiver's site adjacency list and selects the new repeater site from the site adjacency list when the fidelity of communications received from the currently selected repeater site is less than the fidelity of communications received from new repeater site.

10. The method according to claim 8, wherein each repeater site sends a site adjacency message with site adjacency information relevant to that repeater site to a transceiver that newly selects that repeater site.

11. The method according to claim 8, wherein the site adjacency information identifies a repeater site using an associated digital switch identification and a site repeater identification.

12. The method according to claim 8, further comprising:
determining if any site adjacency information has been changed, and updating the site adjacency information established in step (b).

13. The method according to claim 8, wherein the site adjacency list includes a site repeater identification and a site repeater control channel for each entry in the site adjacency list.

14. A method for permitting trunked radio transceivers to roam over two or more trunked radio frequency communications networks, each network including digital repeater sites having corresponding site coverage areas in a particular geographical site configuration and serving trunked radio transceivers disposed within or near the coverage areas, and each network including a digital switch for routing communications to and from said one or more repeater sites, wherein as trunked radio receivers roam over the two or more trunked radio frequency communications networks, geographical site configuration information is transferred between digital network switches.

* * * * *